United States Patent [19]

Boyd et al.

[11] 4,080,215
[45] Mar. 21, 1978

[54] SPONTANEOUS OPAL GLASSES

[75] Inventors: David C. Boyd, Corning; William H. Dumbaugh, Jr., Painted Post; James E. Flannery, Corning, all of N.Y.

[73] Assignee: Corning Glass Works, Corning, N.Y.

[21] Appl. No.: 784,156

[22] Filed: Apr. 4, 1977

[51] Int. Cl.$^2$ .......................... C03C 3/04; C03C 3/08; C03C 3/30

[52] U.S. Cl. ................................. 106/52; 106/39.6; 106/54

[58] Field of Search .......................... 106/54, 52, 39.6

[56] References Cited

U.S. PATENT DOCUMENTS

| | | | |
|---|---|---|---|
| 2,921,860 | 1/1960 | Stockey | 106/52 |
| 3,622,359 | 11/1971 | Dither et al. | 106/52 |
| 3,681,098 | 8/1972 | Dumbaugh, Jr. et al. | 106/52 |
| 4,038,448 | 7/1977 | Boyd et al. | 106/52 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

This invention is concerned with spontaneous opal glasses wherein sodium fluoride (NaF) and strontium fluoride (SrF$_2$) constitute the predominant opacifying phases. More specifically, the opal glasses of the instant invention have compositions within the $Na_2O$—$SrO$—$Al_2O_3$—$SiO_2$—F field and exhibit a dense white appearance, a softening point above 755° C., a strain point in excess of 500° C., a coefficient of thermal expansion (0°–300° C.) in excess of 65° $\times$ 10$^{-7}$/° C., and satisfactory resistance to weathering and dishwasher environments.

5 Claims, No Drawings

SPONTANEOUS OPAL GLASSES

BACKGROUND OF THE INVENTION

Spontaneous opal glasses have been known to the glass art for many years and are produced from compositions which develop opacity as the molten batch is cooled and shaped into a glass article. The opacity is commonly the result of the growth of crystals in the glass, although other types of phase separation phenomena taking place within the glass have been observed as causing opacity therein. Where crystal growth effects the opacity, the content developed is normally quite low, generally less than about 10% by volume, such that the overall physical properties of the glass, other than optical transmission, are very slightly affected, if at all.

Opal glasses have been and are marketed commercially in the as-formed state, i.e., no glaze or other surface decorating agent being applied thereon, but consumer interest interest has been especially prevalent where opal glasses have been employed in culinary and table ware applications. The customer has required articles which combine an aesthetically pleasing appearance with long time service capability.

A highly desirable characteristic of opal glasses is a dense, uniformly milky-white appearance. A very dense opacity is sought to permit the fabrication of thin-walled and, hence, lighter weight articles, while still retaining good opacity. Such glasses, however, have frequently been subject to a lesser or greater degree to a serious problem which has been labeled "flash mark", when articles of culinary or table ware have been molded therefrom. This defect consists of an area of varying degrees of opacity near the base of such articles and constitutes a frequent source of rejection for the ware. Moreover, in view of their physical characteristics, principally coefficient of thermal expansion and low softening point, it has generally been difficult to devise suitable fired-on decorating materials.

PRIOR ART

Spontaneous opal glass articles wherein alkali fluoride crystals with, optionally, alkaline earth fluoride crystals constitute the opacifying phase have frequently been described in the prior art.

U.S. Pat. No. 2,224,469 discloses spontaneous opal glasses containing sodium and/or potassium fluoride crystals to provide opacity. Those glass had compositions consisting essentially, in weight percent, of 13-k16% alkali metal oxides, 5-9% $Al_2O_3$, 65-80% $SiO_2$, at least 3% F, and being substantially free from $B_2O_3$ and oxides from the second group of the Periodic Table.

U.S. Pat. No. 2,921,860 describes spontaneous opal glasses wherein NaF crystals comprise the predominant opal phase. Such glasses consisted essentially, in weight percent, of 0.5-3% $Li_2O$, 6-19.5% $Na_2O$, the total alkali metal oxide content being 12-20%, 2-12%, $Al_2O_3$, 55-75% $SiO_2$, and 5-9% F. Various optional compatible metal oxides such as BeO, MgO, CaO, ZnO, SrO, CdO, and BaO may be present in an amount totalling 6%. Nothing is mentioned regarding the formation of fluoride crystals with any of those metals. CaO, BaO, and ZnO are observed as improving the weathering or chemical durability of the glasses but a caveat is noted regarding their adverse effect upon the striking rate of the NaF crystallites. Up to 5% $B_2O_3$ may be included to adjust such physical properties as glass viscosity and coefficient of thermal expansion.

British Pat. No. 1,289,185 reports spontaneous opal glasses containing LiF and NaF and/or KF crystals as the principal opacifying phase. The glasses consisted essentially, in weight percent, of 0.5-5% $Li_2O$, 2-18% $Na_2O$ and/or $K_2O$, 1.5-12% $Al_2O_3$, 60-80% $SiO_2$, and 2-6% F. Up to 10% $B_2O_3$ may be included to adjust the opal liquidus and modify the viscosity of the glass. CaO is preferably absent since it sharply reduces opacity. MgO, SrO, BaO, $TiO_2$, and $ZrO_2$ are also noted as reducing or destroying opacity, so the total thereof is maintained below 5%. There is no mention of the formation of fluoride crystals with those metals. ZnO is observed to slightly reduce opacity and its presence is limited to a total of 10%. U.S. Application Ser. No. 692,957, filed June 4, 1976, now U.S. Pat. No. 4,038,448 in the names of David C. Boyd et al., illustrates spontaneous opal glasses wherein NaF crystals constitute the predominant opacifying phase. The glasses consist essentially, in weight percent, of 8-13% $Na_2O$, 5-9% $Al_2O_3$, 74-78% $SiO_2$, and 3.5-4.5% F with optional additions including 0-4% $K_2O$, 0-2.5% SrO, and 0-1% $Li_2O$, the sum of all additions to the basic quaternary not exceeding 5%. No mention is made of opacifying crystallites other than NaF. CaO and SrO are observed as degrading opacity.

SUMMARY OF THE INVENTION

Spontaneous opal glasses utilizing NaF crystals as the opacifying phase exhibit a dense white opaque appearance because the refractive index of the light-scattering crystals is much lower than that of the matrix glass (1.336 vs. ~1.48). Glasses of that type, however, commonly have poor weathering resistance and chemical durability because the highly mobile $Na^+$ ions migrate to the surface during the glass-forming operation, thereby producing a glass surface which is highly susceptible to hydration and subsequent destruction of the $SiO_2$ network. Thus, the surface of such glasses must be protected, e.g., by applying a glaze thereto, to have any practical utility. NaF nucleates at the unusually low temperature of about 850° C. Although there are a number of advantages to low temperature nucleation, such glasses are frequently difficult to form by automatic pressing because low-temperature nucleation tends to produce inherently "flat" viscosity-temperature curves.

We have found that the addition of SrO with, optionally, $B_2O_3$ within very narrow composition ranges improves upon those two weaknesses. Thus, the presence of $Sr^{+2}$ ions in the glass matrix tends to block the migration of $Na^+$ ions to the surface and, in so doing, renders the glass surface much less susceptible to hydration and decomposition. Furthermore, $SrF_2$, which nucleates at the much higher temperature of about 1400° C., steepens the viscosity curve, due to the presence of $SrF_2$ crystals therein, thereby making glass forming easier. Moreover and quite unexpectedly, we have found that the presence of $Sr^{+2}$ ions ties up fluorine in the melting unit and so greatly decreases fluorine volatility with a consequent decrease in fluorine pollution of the atmosphere.

$B_2O_3$ is useful in modifying the viscosity curve of the glass and also slows the rate of opalization.

Whereas the presence of SrO and, optionally, $B_2O_3$ can improve the physical characteristics of NaF-containing opal glasses, their additions must be carefully controlled to minimize detrimental side effects. For example, $Sr^{+2}$ ions preferentially tie up the fluorine and thereby reduce the amount of NaF that can form. This is important since the refractive index of $SrF_2$ is only slightly less than that of the matrix glass (1.442 vs. ~1.48). In addition, when molecular and density considerations are contemplated, it is calculated that $SrF_2$ produces about 10% less volume of light scattering particles per fluoride ion than does NaF. Consequently, $SrF_2$ crystals are substantially inferior to NaF as the opacifying phase and, hence, an upper limit of SrO must be set. $B_2O_3$ tends to reduce the rate of nucleation and growth of the NaF crystals and, therefore, may lead to a much less dense opal product.

Besides opacity, chemical durability, and glass forming considerations, the physical properties of a glass for use in culinary and table ware applications must be suitable to permit decorating and thermal tempering. Therefore, the glass ought to have a softening point above 755° C., a strain point above 500° C., and a coefficient of thermal expansion (25°–300° C.) of at least $65° \times 10^{-7}/°$ C. Most preferably, the glass will have a softening point above 772° C., a strain point above 510° C., and a coefficient of thermal expansion in excess of $70° \times 10^{-7}/°$ C.

To adequately fire on a durable and glossy decorating enamel, the glass article will generally be heated to temperatures around 710° C. for several minutes. Therefore, it is apparent that the glass must be hard enough to resist deformation, "slump", or "belt mark" at those temperatures. The glass should have a coefficient of thermal expansion high enough to enable thermal tempering and to put a compressive stress in an enamel applied thereto. Both SrO and $B_2O_3$ work against those requirements — still further reasons for closely controlling the amounts of each added to the base glass composition.

We have found that dense white opal glasses can be prepared from compositions consisting essentially, expressed in weight percent on the oxide basis, of 8–13% $Na_2O$, 0–2% $K_2O$, 8–14% $Na_2O + K_2O$, 5–9% $Al_2O_3$, 3.5–5.5% SrO, 0–2.5% $B_2O_3$, 3.5–7% SrO + $B_2O_3$, 3.5–5.5% F as analyzed, and at least 74% $SiO_2$. KF crystals do not precipitate out of the glass composition and, since $K^+$ ions tie up the fluorine thereby reducing the amount of NaF that can form with consequent reduction in opacity, substantial amounts of $K_2O$ must be avoided. Nevertheless, the inclusion of up to about 2% $K_2O$ does not substantially alter the physical properties of the glass, including opacity, and permits the use of $Na_2O$-containing batch materials wherein $K_2O$ is incidentally present in minor amounts. Such batch ingredients are much less expensive than highly pure $Na_2O$-containing materials. Therefore, whereas the most preferred compositions with respect to opacity will consist essentially solely of $Na_2O$, $Al_2O_3$, SrO, F, $SiO_2$, and, optionally, $B_2O_3$, the use of batch materials containing $K_2O$ as an incidental component in minor amounts, is a very useful commercial expedient.

Various compatible metal oxides as MgO, CaO, BaO, and ZnO can be tolerated but the sum of all such extraneous additions will be held below about 7% by weight. BaO must be held below about 7% and CaO below about 4% to insure dense opacity. Where a colored opal glass is desired, conventional glass colorants, e.g., CoO, NiO, $MnO_2$, $V_2O_5$, and $Fe_2O_3$, may be incorporated in amounts normally less than about 2%.

DESCRIPTION OF PREFERRED EMBODIMENTS

Table I reports glass compositions, expressed in parts by weight on the oxide basis, demonstrating the compositional parameters of the instant invention. Because it is not known with which cation(s) the fluorine is combined, it is simply recited as fluoride (F) in accordance with conventional glass analysis practice. Furthermore, since the sum of the glass components totals approximately 100, the values set forth in Table I can reasonably be considered to be expressed in terms of weight percent. In general, volatilization of fluorine during melting of the batch will be less than about 10%. Where desired, an oxide of arsenic can be present to perform its customary function as a fining agent.

The actual batch ingredients can comprise any materials, either oxides or other compounds, which, when melted together, will be converted into the desired oxide in the proper proportions. The fluorine will commonly be added in the form of sodium silicofluoride. Although the following discussion reflects laboratory scale melting, it will be appreciated that the compositions could also be utilized in large scale commercial melting. $K_2O$ was not intentionally included as a specific component in the exemplary compositions but is only introduced because of its incidental presence in the batch materials.

The batch ingredients for the exemplary compositions of Table I were compounded, ballmilled together to assist in obtaining a homogeneous melt, and then deposited in platinum crucibles. The crucibles were covered, placed into a furnace operating at about 1450°–1550° C., and the batches melted for four hours with stirring. The melts were then cast into steel molds to produce slabs about 6 inches × 6 inches × ½ inch and the slabs immediately transferred to an annealer operating at about 500°–550° C.

TABLE I

| | 1 | 2 | 3 | 4 | 5 | 6 | 7 | 8 |
|---|---|---|---|---|---|---|---|---|
| $SiO_2$ | 78.94 | 78.35 | 77.76 | 77.19 | 77.44 | 77.13 | 78.53 | 79.29 |
| $Al_2O_3$ | 6.21 | 6.16 | 6.11 | 6.07 | 7.14 | 8.15 | 6.08 | 6.04 |
| $Na_2O$ | 11.05 | 10.64 | 10.24 | 9.84 | 9.56 | 8.89 | 9.54 | 8.85 |
| $K_2O$ | 1.25 | 1.24 | 1.23 | 1.22 | 1.23 | 1.22 | 1.23 | 1.22 |
| SrO | 2.17 | 3.23 | 4.27 | 5.3 | 4.25 | 4.24 | 4.25 | 4.22 |
| F | 4.0 | 4.0 | 4.0 | 4.0 | 4.0 | 4.0 | 4.0 | 4.0 |

| | 9 | 10 | 11 | 12 | 13 | 14 | 15 |
|---|---|---|---|---|---|---|---|
| $SiO_2$ | 77.1 | 76.2 | 75.5 | 79.1 | 76.6 | 76.4 | 78.4 |
| $Al_2O_3$ | 6.3 | 6.0 | 6.2 | 7.2 | 6.5 | 6.5 | — |
| $Na_2O$ | 11.3 | 10.0 | 9.0 | 10.1 | 8.9 | 9.6 | 9.6 |
| $K_2O$ | 1.3 | 1.2 | 1.2 | 1.3 | 1.5 | 1.2 | 1.2 |
| F | 4.0 | 4.0 | 4.0 | 4.0 | 4.0 | 4.5 | 4.5 |
| SrO | — | — | — | — | 4.1 | 3.9 | 1.2 |
| BaO | — | 4.4 | 7.7 | — | — | — | — |
| CaO | — | — | — | 2.9 | — | — | — |
| $B_2O_3$ | — | — | — | — | 1.3 | 2 | 2.6 |

Samples of the necessary geometry for testing purposes were cut from the aforementioned annealed slabs and Table II reports a number of physical properties determined on Examples 1–15 employing measuring techniques conventional to the glass art. Such include softening point (S.P.) in ° C., annealing point (A.P.) in ° C., strain point (St. P.) in ° C., coefficient of thermal expansion (Exp.) over the range of 25°–300° C. × $10^{-7}/°$ C., and density (Den.) in g/cc.

Testing for weathering and resistance to dishwasher environments was undertaken utilizing three different methods.

(1) The glass samples were placed in a weathering cabinet for 24 hours at 50° C. and 95% relative humidity. The samples were removed periodically from the cabinet and visually inspected in oblique light for surface attack. An A rating indicates an acceptable resistance whereas a C rating denotes outright rejection.

(2) The glasses were placed in boiling soft water for three hours, removed therefrom, and air dried. The samples were then transferred to an electric oven operating at 250° C. and retained therein for 20 minutes. The appearance of any surface crazing was deemed to indicate failure in the test.

(3) The glasses were placed in an autoclave at 120° C. and two atmospheres steam pressure for three hours, then removed therefrom and air dried. The samples were thereafter moved to an electric oven operating at 250° C. and held therein for 20 minutes. The development of any surface crazing denoted failure in the test.

TABLE II

| Example No. | S.P. | A.P. | St. P. | Exp. | Dens. | Weathering | Boiling | Autoclave |
|---|---|---|---|---|---|---|---|---|
| 1 | 771 | 559 | 519 | 74.1 | 2.538 | C | Slight crizzle | — |
| 2 | 771 | 557 | 512 | 71.3 | 2.371 | C | " | — |
| 3 | 768 | 556 | 516 | 69.1 | 2.384 | B | Pass | Slight crizzle |
| 4 | 762 | 560 | 512 | 69.1 | 2.39 | A | " | Pass |
| 5 | 801 | 610 | 563 | 75.9 | 2.374 | A | " | " |
| 6 | 780 | 584 | 537 | 65.2 | 2.380 | A | " | " |
| 7 | 776 | 554 | 517 | 69.6 | 2.376 | A | " | " |
| 8 | 791 | 570 | 532 | 63.0 | 2.367 | A | " | " |
| 9 | 780 | 560 | 520 | 72.0 | 2.33 | C | Fail | Fail |
| 10 | — | 551 | 511 | — | 2.41 | C | " | " |
| 11 | 750 | 554 | 498 | 70.1 | 2.44 | B | Pass | Slight crizzle |
| 12 | 755 | 551 | 508 | 68.4 | 2.36 | B | Pass | Slight crizzle |
| 13 | 761 | 565 | 526 | 66.7 | 2.380 | A | " | "" |
| 14 | 757 | 576 | 535 | 68.5 | 2.398 | A | " | "" |
| 15 | 756 | 566 | 525 | 64.7 | 2.397 | A | " | " " |

Table II illustrates the compositional parameters which must be observed to insure the production of glasses having the desired chemical durability and physical properties, particularly a softening point in excess of 755° C., a strain point above 500° C., and a coefficient of thermal expansion (25°–300° C.) greater than 65° × $10^{-7}$/° C. Thus, the inclusion of SrO in an amount of at least 3.5% is seen to be vital. Example 9, containing no alkaline earth metal oxide, and Examples 10–12, containing BaO or CaO, do not pass the durability tests. Examples 13 and 14 demonstrate that glasses containing $B_2O_3$ in addition to SrO can display good durability. Example 15, however, illustrates that whereas the addition of 0.6% $B_2O_3$ to Example 14 will compensate for the lower SrO content, as far as durability is concerned, both the softening point and the coefficient of thermal expansion are reduced to prohibitively low values.

Therefore, a preferred upper limit for $B_2O_3$ is 1.5%. Examples 1 and 2, containing less than 3.5% SrO, failed the durability test. Examples 3–8, containing SrO alone, illustrate property variations resulting from altering the contents of alkali metal, $Al_2O_3$, and $SiO_2$. The inclusion of $B_2O_3$ serves to improve chemical durability, as is shown by Example 15. Therefore, when SrO is present without $B_2O_3$, the preferred amount will be at least 4%. Each of the exemplary compositions of Table I displayed a dense milky-white opacity, although Examples 11 and 12 appeared to be somewhat less opaque than the others.

We claim:

1. A spontaneous opal glass body exhibiting a dense, milky-white appearance, a softening point in excess of 755° C., a strain point greater than 500° C., a coefficient of thermal expansion (25°–300° C.) of at least 65° × $10^{-7}$/° C., and good chemical durability consisting essentially, in weight percent of the oxide basis, of 8–13% $Na_2O$, 0–2% $K_2O$, 8–14% $Na_2O + K_2O$, 5–9% $Al_2O_3$, 3.5–5.5% SrO, 0–2.5% $B_2O_3$, 3.5–7% SrO + $B_2O_3$, 3.5–5.5% F as analyzed, and at least 74% $SiO_2$.

2. A spontaneous opal glass according to claim 1 wherein said opal glass also contains 0–7% BaO and 0–4% CaO.

3. A spontaneous opal glass according to claim 1 wherein the sum of all additions to the $Na_2O$—$K_2O$—$Al_2O_3$—$B_2O_3$—SrO—$SiO_2$—F composition system is no more than 7% of the total composition.

4. A spontaneous opal glass according to claim 1 wherein SrO is present in an amount of at least 4%.

5. A spontaneous opal glass according to claim 1 wherein $B_2O_3$ is present in an amount not exceeding 1.5%.

* * * * *

UNITED STATES PATENT AND TRADEMARK OFFICE
CERTIFICATE OF CORRECTION

PATENT NO. : 4,080,215

DATED : March 21, 1978

INVENTOR(S) : David C. Boyd, William H. Dumbaugh, Jr., and James E. Flannery

It is certified that error appears in the above-identified patent and that said Letters Patent are hereby corrected as shown below:

Column 1, line 51, "13-k16%" should be -- 13-16% --.

Column 3, line 21, "65°" should be -- 65 --.

Column 3, line 25, "70°" should be -- 70 --.

Column 5, line 40, "65°" should be -- 65 --.

Column 6, line 4 of Claim 1, "65°" should be -- 65 --.

Signed and Sealed this

Fifth Day of December 1978

[SEAL]

Attest:

RUTH C. MASON
*Attesting Officer*

DONALD W. BANNER
*Commissioner of Patents and Trademarks*